(12) United States Patent
Manku

(10) Patent No.: US 8,707,389 B2
(45) Date of Patent: Apr. 22, 2014

(54) MULTI-TRANSPORT MODE DEVICES HAVING IMPROVED DATA THROUGHPUT

(75) Inventor: Tajinder Manku, Waterloo (CA)

(73) Assignee: Pravala Inc., Kitchener, ON (CA)

(*) Notice: Subject to any disclaimer, the term of this patent is extended or adjusted under 35 U.S.C. 154(b) by 672 days.

(21) Appl. No.: 12/631,397

(22) Filed: Dec. 4, 2009

(65) Prior Publication Data
US 2010/0154044 A1    Jun. 17, 2010

Related U.S. Application Data

(60) Provisional application No. 61/119,966, filed on Dec. 4, 2008.

(51) Int. Cl.
*G06F 21/00*    (2013.01)

(52) U.S. Cl.
USPC ............................................... 726/2; 709/204

(58) Field of Classification Search
None
See application file for complete search history.

(56) References Cited

U.S. PATENT DOCUMENTS

| | | | | |
|---|---|---|---|---|
| 6,421,714 | B1* | 7/2002 | Rai et al. ........................ | 709/217 |
| 7,539,175 | B2* | 5/2009 | White et al. ................... | 370/350 |
| 7,805,156 | B1 | 9/2010 | Allen et al. | |
| 7,917,129 | B2 | 3/2011 | Souisse et al. | |
| 7,969,931 | B2 | 6/2011 | Bachmann et al. | |
| 8,019,820 | B2* | 9/2011 | Son et al. ...................... | 709/206 |
| 2002/0039884 | A1* | 4/2002 | Raynes et al. ................ | 455/13.3 |
| 2002/0157007 | A1* | 10/2002 | Sashihara ...................... | 713/183 |
| 2006/0068777 | A1* | 3/2006 | Sadowsky et al. ............ | 455/427 |
| 2006/0111045 | A1 | 5/2006 | Orlassino et al. | |
| 2007/0008885 | A1 | 1/2007 | Bonner | |
| 2007/0249387 | A1 | 10/2007 | Doradla et al. | |
| 2008/0095119 | A1 | 4/2008 | Bachmann et al. | |
| 2008/0159232 | A1* | 7/2008 | Thalanany et al. ........... | 370/332 |
| 2008/0175188 | A1 | 7/2008 | Kozisek et al. | |
| 2008/0293403 | A1 | 11/2008 | Quon et al. | |
| 2009/0327393 | A1 | 12/2009 | Lin et al. | |
| 2010/0085948 | A1 | 4/2010 | Yu et al. | |
| 2010/0195611 | A1 | 8/2010 | Allen et al. | |
| 2010/0316028 | A1 | 12/2010 | Allen et al. | |
| 2012/0033658 | A1 | 2/2012 | Ganesan | |
| 2012/0044908 | A1 | 2/2012 | Spinelli et al. | |

FOREIGN PATENT DOCUMENTS

WO    WO 2006012018 A1    2/2006

OTHER PUBLICATIONS

International Search report issued by the Canadian Intellectual Property Office dated Apr. 6, 2010 for corresponding International Application No. PCT/CA2009/001767 filed Dec. 4, 2009.

(Continued)

*Primary Examiner* — Lisa Lewis
(74) *Attorney, Agent, or Firm* — Jonathan Pollack

(57) ABSTRACT

A method for transmitting data between a client and a server is provided. The method comprising the following steps. The data is segmented into a plurality of data packets, which are scheduled to be transmitted via different ones of a plurality of access points. Each of the plurality of access points is configured to communicate with the client using a different protocol and communicate with the server using a different network path. Each of the plurality of data packets is transmitted between the client and the server via the scheduled access point. A client device and proxy server configured to implement the method are also provided, as is a computer readable medium having stored thereon instructions for implementing the method.

13 Claims, 4 Drawing Sheets

(56) References Cited

OTHER PUBLICATIONS

Written Opinion of the International Searching Authority issued by the Canadian Intellectual Property Office dated Apr. 6, 2010 for corresponding International Application No. PCT/CA2009/001767 filed Dec. 4, 2009.

International Preliminary Report of Patentability issued by the International Bureau of WIPO dated Jun. 7, 2011 for corresponding International Patent Application No. PCT/CA2009/001767.

European Patent Office, Search Report and Search Opinion dated May 4, 2012.

United States Patent Office, Office Action dated Nov. 8, 2012.

\* cited by examiner

600

MULTI-TRANSPORT MODE DEVICES HAVING IMPROVED DATA THROUGHPUT

The present invention relates generally to devices having multi-transport modes and specifically to a method for improving the data throughput on such devices. This application claims priority from U.S. Provisional Application No. 61/119,966 filed Dec. 4, 2008.

BACKGROUND

The proliferation of the Internet and mobile computing devices has led to a number of different mechanisms and protocols for connecting the two together. In order to unleash computing devices from the physical limitation of Ethernet connections, wireless communication protocols have developed.

One wireless technology area is a wireless local area network (WLAN). An example of a WLAN is Wi-Fi, which was developed by the Wi-Fi Alliance. Wi-Fi allows local area networks (LANs) to be deployed without wires for client devices, typically reducing the costs of network deployment and expansion. Spaces where cables cannot be run, such as outdoor areas and historical buildings, can host wireless LANs. Therefore, portable devices such as notebook computer, video game consoles, mobile phones and personal digital assistants can connect to the Internet when within range of a wireless LAN connected to the Internet.

However, Wi-Fi networks have limited range. A typical wireless router using 802.11b or 802.11g with a stock antenna has a range of approximately 32 m indoors and 95 m outdoors. Although the new 802.11n standard exceeds this range, it is still fairly limited. Due to reach requirements for wireless LAN applications, power consumption is fairly high compared to some other standards.

Another wireless technology area is a wireless wide area network (WWAN). An example of a WWAN is radio technology. Initially wireless service providers provided different data packet radio technology depending on the infrastructure they had already established. For example, wireless service providers running on a CDMA infrastructure introduced EVDO to provide data packet transfer. Wireless providers running on a GSM infrastructure introduced GPRS to provide data packet transfer. Currently, the GSM and CDMA infrastructures are running 3G standards. However, as the technology evolves, it appears as if most wireless service providers are moving towards the fourth generation of radio technologies, referred to as Long Term Evolution (LTE).

As both WLAN and WWAN technologies develop, it is becoming accepted that the technologies can be used to complement each other. For example, while WLAN is relatively cheap to implement, WWAN technologies are still relatively expensive. While WLAN has limited range, WWAN technologies offer a much broader range.

Accordingly, devices that offer both WLAN and WWAN technologies are currently sought after. These devices allow a user to transmit data using either technology depending on user preferences as well as network availability.

However, even the most recent WLAN protocol and newly introduced WWAN technologies offer only a portion of the bandwidth available via connections such as Ethernet. Accordingly, it is desirable to improve the throughput of mobile computing devices.

SUMMARY

Accordingly, one aspect of the present invention provides the ability for a device to transmit and receive data using different data transmission technologies available on a single device, practically at the same time.

A further aspect of the present invention provides a method for transmitting data between a client and a server, the method comprising the steps of: segmenting the data into a plurality of data packets; scheduling the plurality of packets to be transmitted via different ones of a plurality of access points, each of the plurality of access points configured to: communicate with the client using a different protocol; and communicate with the server using a different network path; and transmitting each of the plurality of data packets between the client and the server via the scheduled access point.

A further aspect of the present invention provides a client device configured to transmit data to and receive data from a proxy server, the client device comprising: a computer readable medium having stored thereon instructions for a device scheduler; a processor configured to execute the device scheduler, the device scheduler operable to: segment the data to be transmitted into a plurality of data packets; and schedule the plurality of packets to be transmitted via different ones of a plurality of access points, each of the plurality of access points configured to communicate with the client using a different protocol, and communicate with the proxy server using a different network path; and transceivers configured to transmit the plurality of data packets to corresponding access points for sending to the proxy server and receive data from the proxy server via the corresponding access points.

Yet a further aspect of the present invention provides a proxy server configured to transmit data to and receive data from a client device, the proxy server comprising: a computer readable medium having stored thereon instructions for a proxy scheduler; a processor configured to execute the proxy scheduler, the proxy scheduler operable to: segment the data to be transmitted into a plurality of data packets; and schedule the plurality of packets to be transmitted via different ones of a plurality of access points, each of the plurality of access points configured to communicate with the client using a different protocol, and communicate with the proxy server using a different network path; and a transceiver interface configured to transmit data to and receive data from a target server.

Yet a further aspect of the present invention provides a computer readable medium having stored thereon instructions for transmitting data between a client and a proxy server, the instructions, when executed by a processor, cause the processor to implement the steps of: segmenting the data into a plurality of data packets; scheduling the plurality of packets to be transmitted via different ones of a plurality of access points, each of the plurality of access points configured to: communicate with the client using a different protocol; and communicate with the proxy server using a different network path; and transmitting each of the plurality of data packets between the client and the proxy server via the scheduled access point.

BRIEF DESCRIPTION OF THE DRAWINGS

Embodiments of the present invention will now be described by way of example only with reference to the following drawings in which.

DETAILED DESCRIPTION

Figure 1:
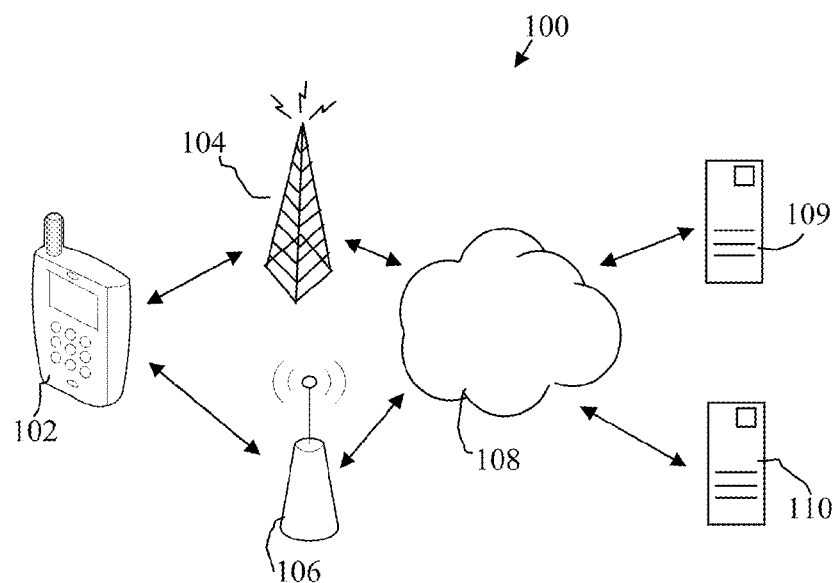
FIG. 1 is a block diagram of a network infrastructure.

For convenience, like numerals in the description refer to like structures in the drawings. Referring to FIG. 1, a diagram illustrating a network environment is illustrated generally by numeral 100. The network 100 comprises a client 102, a first access point 104, a second access point 106 a network 108, a proxy server 109 and a server 110.

In the present embodiment, the client 102 is a mobile device such as a portable computer, smartphone or a personal digital assistant (PDA), such as the iPhone® by Apple, Inc. or the Blackberry® by Research in Motion Limited, for example. The first access point 104 is a 3G base station. The second access point 106 if a Wi-Fi access point. Both the 3G base station 104 and the Wi-Fi access point 106 have their own Internet Protocol (IP) address. The proxy server 109 is a multi-homed server comprising two, or more, IP addresses. The server 110 is a remote computing device from which the mobile device 102 is requesting information. The proxy server 109 is described as being separate from the server 110 for ease of explanation. However, both the proxy server 109 and the server 110 may operate on the same physical machine.

As is known in the art, data is typically segmented into data packets for transmission across a network. Accordingly, the mobile device 102 transmits data as a plurality of data packets to a target server 110. Software executing on the mobile device 102 routes the data packets over a Wi-Fi network via the Wi-Fi access point 106 using a first IP address associated with a Wi-Fi transceiver on the mobile device 102. The data packets are also routed over a 3G network via the 3G base station 104 using a second IP address associated with a 3G transceiver on the mobile device 102. Thus, the effective bandwidth available to the mobile device 102 to transmit data is increased. The proxy server 109 executes software that that combines data packets received from the mobile device 102 via both the Wi-Fi network and the 3G network. The combined data packets are then routed to the server 110.

The target server 110 transmits data to the mobile device 102 via the proxy server 109. The software executing on the proxy server 109 routes the data packets to the mobile device 109 over the 3G network and the Wi-Fi network using the first and second IP addresses to identify the networks. The mobile device 102 executes software that that combines data packets received from the proxy server 109 via both the Wi-Fi network and the 3G network, thereby increasing the effective bandwidth available to the mobile device 102 to receive data.

Figure 2:
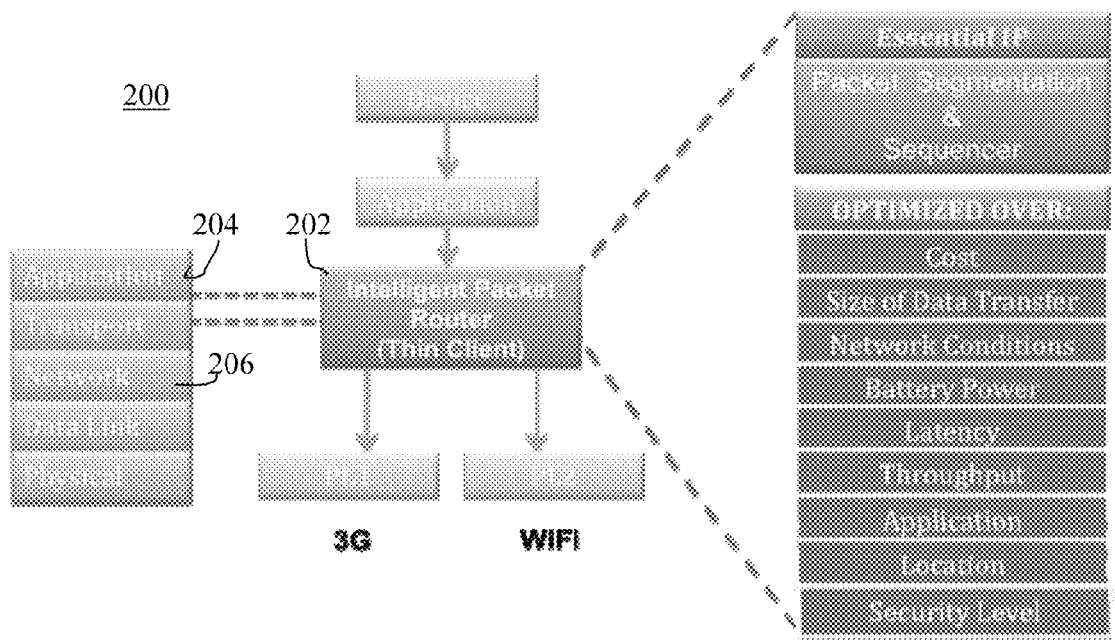
FIG. 2 is block diagram illustrating a software structure on a mobile device.

Referring to FIG. 2, an illustration of the software structure on the mobile device 102 is shown generally by numeral 200. In order to be transparent to other software applications executing on the mobile device 102, a device scheduler 202 is placed between an application layer 204 and a transport layer 206 of the Open System Interconnection (OSI) Reference Model.

The device scheduler 202 is configured with preset conditions for routing data via either the 3G base station 104 or the Wi-Fi access point 106. However, as will be appreciated by a person of ordinary skill in the art, custom conditions may be entered manually by a user of the mobile device 102. Depending on the configuration of the device scheduler 202, for conflicting conditions either the custom conditions or the preset conditions may take priority.

The preset or custom conditions are based on one or more of a number of different parameters. Examples of these parameters include cost, size of data transfer, network conditions, battery power, latency, throughput, application, location, and security level.

Although the functionality is similar, the software at the proxy server 109 does not have to be transparent to other applications on the proxy server 109. Accordingly, the software at the proxy server 109 is not implemented using the same software structure as on the mobile device 102. However, it could be similarly implemented. In the present embodiment, a proxy scheduler (not shown) is implemented as a typical software application on the proxy server 109. The proxy scheduler is configured to route data over multiple networks for each of a plurality of different devices. Similarly to the device scheduler 202, the proxy scheduler is configured with preset conditions that may be customizable. The preset or custom conditions are based on one or more of a number of different parameters. However, the importance of different parameters need not be the same at the wireless device 102 as at the proxy server 109.

The proxy scheduler and the proxy server 109 provide a scalable solution to routing data between servers 110 and a plurality of mobile devices 102.

Figure 3:
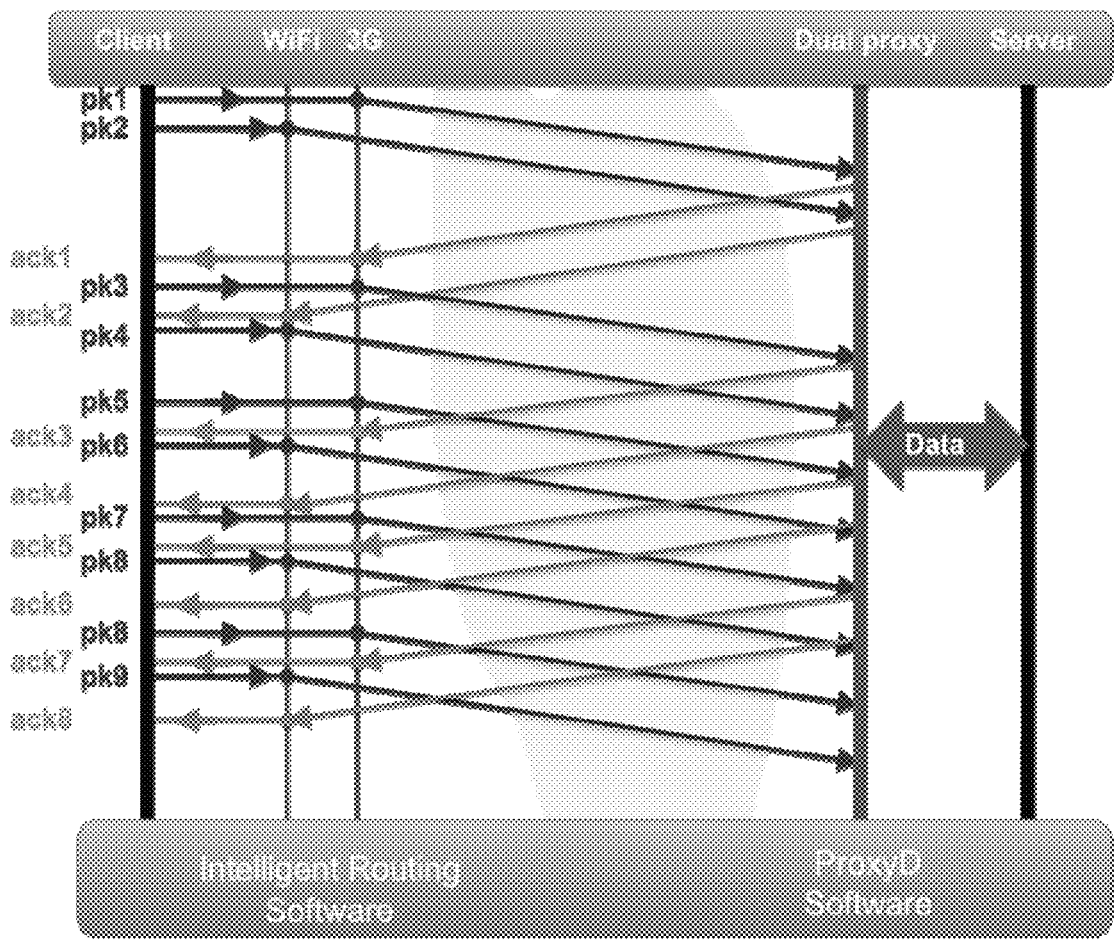
FIG. 3 is a data flow diagram illustrating an example of data packet routing.

In one embodiment, the data transmitted between the mobile device 102 and the proxy server is transmitted alternately between the 3G network and the Wi-Fi network. Referring to FIG. 3, a data flow diagram illustrating this example of data packet routing from the mobile device 102 to the proxy server 109 is shown generally by numeral 300. The data packets are alternately routed between the Wi-Fi network and the 3G network. Therefore, a first packet pk1 is transmitted via the 3G network while a second packet pk2 is transmitted via the Wi-Fi network. A third packet pk3 is transmitted via the 3G network while a fourth packet pk4 is transmitted via the Wi-Fi network. This pattern continues until all the packets have been transmitted. For each data packet, an acknowledgement ack is returned to the mobile device 102 from the proxy server 109 via the network on which the data packet was received. Thus, for example, an acknowledgement ack1 of the first data packet pk1 is transmitted via the 3G network while an acknowledgement ack2 of the second data packet pk2 is transmitted via the Wi-Fi network.

Although the present embodiment describes an even distribution of data packets across the 3G network and the Wi-Fi network, the ratio of packets may differ depending on the conditions in place at the device scheduler 202.

For example, if the device scheduler 202 is configured to reduce costs, a plurality of data packets will be transmitted across the cheaper network, usually the Wi-Fi network, for each data packet transmitted across the more expensive network, usually the 3G network.

As another example, if the device scheduler 202 is configured to reduce battery power, a plurality of data packets will be transmitted across the network that uses less power on the mobile device 102, usually the 3G network, for each data packet transmitted across the network that uses more power on the mobile device 102, usually the Wi-Fi network.

As another example, if the size of the data transfer is large, a plurality of data packets will be transmitted across the faster network, usually the Wi-Fi network, for each data packet transmitted across the slower network, usually the 3G network.

If it is important to try and maximize throughput, the ratio of the number of data packets transmitted over the faster network to number of data packets transmitted over the slower network is approximately the same as the ratio of the speed of the faster network to the speed of the slower network. For example, if the Wi-Fi network is capable of transmitting data packets twice as fast as the 3G network, then twice as many data packets are routed to the Wi-Fi network by the device scheduler 202. A number of factors may affect the speed of the network, such as bandwidth and latency.

As another example, if the device scheduler 202 is configured to provide enhanced security, a plurality of data packets will be transmitted across the more secure network, usually the 3G network, for each data packet transmitted across the less secure network, usually the Wi-Fi network. One reason the Wi-Fi network may be considered less secure is that it is often accessed via public Wi-Fi access points 106 that do not provide the same level of security as the 3G base stations 104 of the 3G network. Dispersing fewer packets across the less secure network would make it more difficult to properly interpret any intercepted packets. Alternatively, data packets that are identified as being secure may be transmitted exclusively over the more secure network.

Network conditions may also affect the manner in which the device scheduler 202 routes data packets. For example, it is possible that either or both of the Wi-Fi and 3G networks will experience lost packets from time to time. In such a case, an acknowledgement ack signal is not received. The device scheduler 202 is configured to attempt to resend the data packet, using the same network on which it was originally transmitted, a predetermined number of times. Once the predetermined number of attempts to transmit the data packet via one network have been exhausted, the data packet is resent on the other network.

Figure 4:
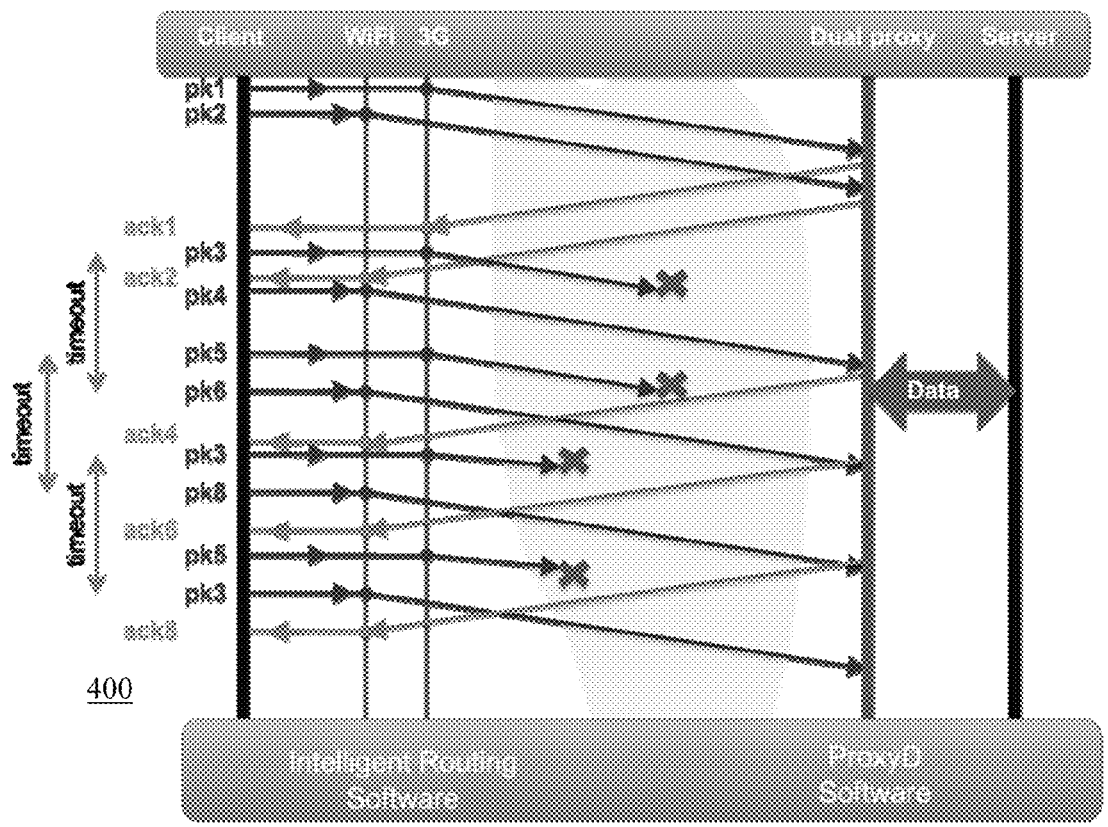
FIG. 4 is a data flow diagram illustrating an example of data packet routing when a data packet gets lost.

Referring to FIG. 4, a data flow diagram illustrating this example of re-routing lost data packets from the mobile device 102 to the proxy server 109 is shown generally by numeral 400. Similar to the example shown in FIG. 3, the data packets are alternately routed between the Wi-Fi network and the 3G network. The first data packet pk1 is transmitted via the 3G network while the second data packet pk2 is transmitted via the Wi-Fi network. The third data packet pk3 is transmitted via the 3G network while the fourth data packet pk4 is transmitted via the Wi-Fi network. However, after a timeout, no acknowledgement ack3 has been received and the third data packet pk3 is considered to be lost. The third data packet is transmitted via the 3G network again. However, after a second timeout, no acknowledgement ack3 has been received and the third data packet pk3 is again considered to be lost. The next time the third data packet pk3 is transmitted, it is sent via the Wi-Fi network.

Another network condition that may affect the scheduling of the data packets is network availability. For example, there will be times that the connection to the Wi-Fi network wanes. Similarly, there will be times that the connection to the 3G network wanes. Further, since the mobile device 102 is mobile, there will likely be a dynamic waxing and waning of the different networks as the mobile device 102 moves around.

Figure 5:
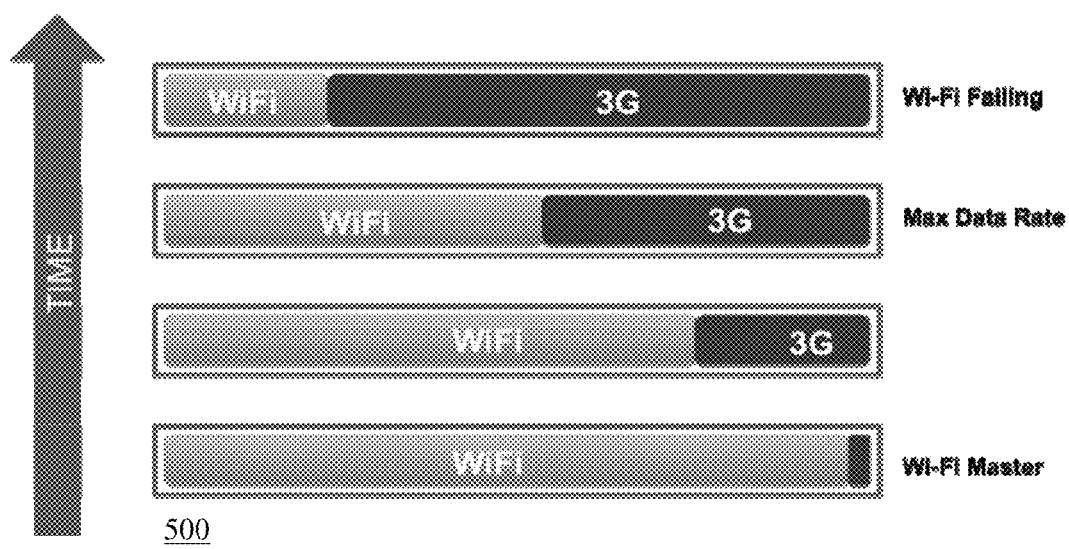
FIG. 5 is a graph illustrating how the data packet transfer rate of the WWAN network and the WLAN network can change.

Referring to FIG. 5, a graph illustrating how the proportional data packet transmission rate between the Wi-Fi network and the 3G network can change with time is shown generally by numeral 500. At time t=0 most of the data packets are being transferred via the Wi-Fi network, since the Wi-Fi network has a much stronger connection. However, as the Wi-Fi fails, or the 3G network improves, the transfer of data packets via the 3G network increases. As the Wi-Fi connection begins to fail and the 3G network improves, more data packets are transferred via the 3G network. This works similarly in reverse.

Although the examples described above are described from the perspective of the device scheduler 202, they may also be implemented at the proxy scheduler.

Figure 6:
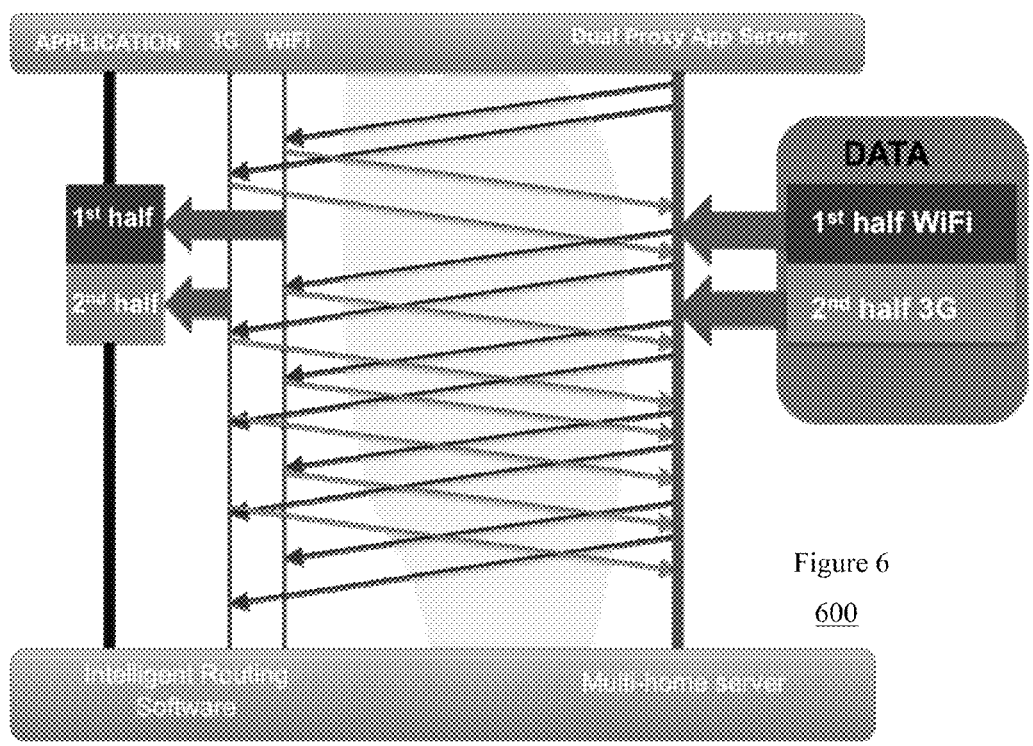
FIG. 6 is a data flow diagram illustrating an alternate example of data packet routing.

Further, although the examples described above describe determining routing of the data on a per packet basis, the decision may be made differently. Referring to FIG. 6, a data flow diagram illustrating an example of predetermining the routing of data from the proxy server 109 to the mobile device 102 is shown generally by numeral 600. The data to be transmitted can be split into two, with one portion to be sent over the Wi-Fi network and once portion to be sent over the 3G network. The proportion of the data split does not have to be even and the concept of proportioning the distribution of data packets based on different parameters, as discussed above, may also apply here. The device scheduler 202 is configured to reconstruct the data once it is received Although the example described above is described from the perspective of the proxy scheduler, it may also be implemented at the device scheduler 202.

Figure 7:
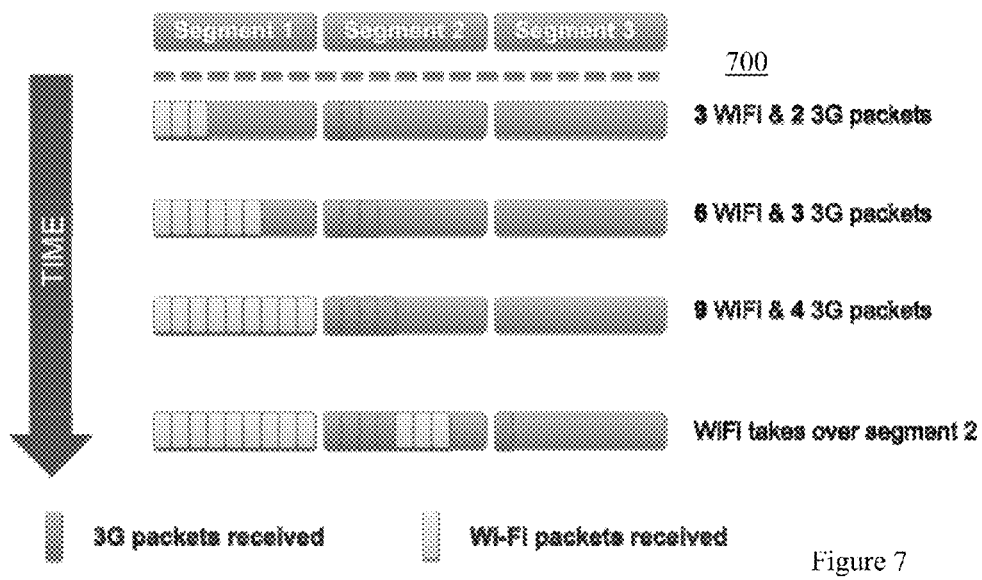
FIG. 7 is a data flow diagram illustrating an example of data packet routing in segments.

Referring to FIG. 7, a data flow diagram illustrating an example of transferring data in segments is shown generally by numeral 700. In this example, data packets are scheduled in segment lengths. In the present example, the segment lengths are equal, although they need not be. A first segment, Segment 1, is filled with data packets to be scheduled on the faster network, usually the Wi-Fi network. A second segment, Segment 2 is initially filled with data packets to be transmitted on the slower network, usually the 3G network. The number of data packets to be transmitted on the slower network is determined to correspond with the amount of time it takes to transmit the previous segment, Segment 1. The remaining portion of the second segment is filled with data packets to be transmitted on the faster network.

For example, assume a segment length of nine data packets and a network transfer speed advantage of three-to-one in favour of the Wi-Fi network. Therefore, in the amount of time it would take to fill the first segment, Segment 1, with data packets over the Wi-Fi network, three data packets for the second segment, Segment 2, can be sent over the 3G network. The remaining six data packets in the second segment, Segment 2, would be sent over the Wi-Fi network.

In the amount of time it would take to fill the remaining second segment, Segment 2, with data packets over the Wi-Fi network, two data packets for a third segment, Segment 3, can be sent over the 3G network. The remaining three data packets in the third segment, Segment 3, would be sent over the Wi-Fi network. It will be appreciated that this scheme can improve buffering for streaming data applications as data packets can be "pre-buffered" using the slower network.

In another embodiment, the device scheduler 302 can schedule the data packets based on the application sending the data. For example, applications that do not require high quality of service (QoS) can be transmitted using one network, while applications that do require a high QoS can be transmitted using the other network. In another example, applications that require a high QoS can be assigned to different networks to reduce bottlenecks on a single network. Which of these examples to implement depends on the types applications installed on the mobile device 102.

In another embodiment, the device scheduler 302 or the proxy scheduler can schedule the data packets in accordance with the type of data the data packets represent. For example one network can be used to send data packets that represent voice over IP (VoIP) data whereas the other network can be used to send video data.

In another embodiment, one of the networks may be used to register the mobile device 102 onto the other network. For example, the mobile device 102 attempts to connect to the Wi-Fi access point 106. However, it is discovered that the Wi-Fi access point 106 requires a security password. The mobile device 102 can use the 3G network to obtain the security password from a predefined password server via the proxy server 109. The mobile device 102 then uses the security password to gain access to the Wi-Fi access point 106 and data can be transmitted between the proxy server and the mobile device 102 as described above.

Although the embodiments described above recite a mobile device 102 that is capable of transmitting via both a WWAN and WLAN network. However, it is possible that the mobile device 102 lacks a WLAN connection but is tethered to another device to obtain its WLAN connection. For example a mobile device 102 with only a WWAN transceiver can be tethered, via Bluetooth, to a laptop computer to obtain the WLAN connection. Similarly, the client 102 need not be a wireless device. For example, the client could be the laptop computer, having a WLAN connection, that is tethered, via Bluetooth, to a mobile device to obtain the WWAN connection.

Although the description makes specific reference to Wi-Fi and 3G, a person of ordinary skill will appreciate that other WLAN and WWAN technologies can likewise be implemented.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the terms "software" and "application" as used herein are intended to encompass a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links. The client device 102 does not need to be mobile and the first and second access points 104 and 106 do not need to provide a wireless connection to the network.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the scope of the appended claims.

What is claimed is:

1. A method for transmitting data between a client and a proxy server, the method comprising the steps of:
    segmenting the data into a plurality of data packets;
    scheduling each of the plurality of packets to be transmitted via corresponding ones of a plurality of access points, thereby increasing the effective bandwidth available for transmitting the data, each of the plurality of access points configured to:
        communicate with the client using a different protocol; and
        communicate with the proxy server using a different network path; and
    transmitting each of the plurality of data packets between the client and the proxy server via the scheduled plurality of access points.

2. The method of claim 1, wherein the ratio of a number of the data packets scheduled on different ones of the access points is determined in accordance with one or more predetermined parameter.

3. The method of claim 2, wherein the one or more predetermined parameter is one or more of cost, size of data, network conditions, battery power, latency, throughput, location or security level.

4. The method of claim 2, wherein the ratio of a number of the data packets scheduled on different ones of the access points changes dynamically as the one or more predetermined parameter changes.

5. The method of claim 1, wherein each of the plurality of data packets are scheduled in accordance with at least one of:
    a type of application transmitting the data packets; or
    a type of data represented by the data packets.

6. The method of claim 1 comprising the further step of transmitting ones of the plurality of data packets between the client and the server via an access point other than the scheduled access point upon detection of a transmission failure.

7. The method of claim 1, comprising the further step of tethering the client to another machine in order to access one of the plurality of access points.

8. The method of claim 1, wherein at least one of the plurality of access points requires a password that is unknown by the client, the method comprising the further steps of:
    transmitting, from the client, a password request for using at least one access point that is accessible to the client;
    receiving, at the client, a password for the at least one of the plurality of access points requiring a password; and
    using the received password to obtain access to the at least one of the plurality of access point requiring a password.

9. The method of claim 1, wherein the plurality of data packets are arranged into segments and scheduled such that while data packets are being transferred for a given segment via a faster one of the access points, data packets for a subsequent segment are being transferred via a slower one of the access points.

10. A client device configured to transmit data to and receive data from a proxy server, the client device comprising:

a computer readable medium having stored thereon instructions for a device scheduler;

a processor configured to execute the device scheduler, the device scheduler operable to:

segment the data to be transmitted into a plurality of data packets; and schedule each of the plurality of packets to be transmitted via corresponding ones of a plurality of access points, thereby increasing the effective bandwidth available for transmitting the data, each of the plurality of access points configured to communicate with the client device using a different protocol, and communicate with the proxy server using a different network path; and transceivers configured to transmit the plurality of data packets to corresponding access points for sending to the proxy server and receive data from the proxy server via the corresponding access points.

11. The client device of claim 10 having a distinct Internet Protocol (IP) address for each transceiver.

12. A proxy server configured to transmit data to and receive data from a client device, the proxy server comprising:

a computer readable medium having stored thereon instructions for a proxy scheduler;

a processor configured to execute the proxy scheduler, the proxy scheduler operable to:

segment the data to be transmitted into a plurality of data packets; and schedule each of the plurality of packets to be transmitted via corresponding ones of a plurality of access points, thereby increasing the effective bandwidth available for transmitting the data, each of the plurality of access points configured to communicate with the client device using a different protocol, and communicate with the proxy server using a different network path; and a transceiver interface configured to transmit data to and receive data from a target server.

13. A non-transitory computer readable medium having stored thereon instructions for transmitting data between a client and a proxy server, the instructions, when executed by a processor, cause the processor to implement the steps of:

segmenting the data into a plurality of data packets;

scheduling each of the plurality of packets to be transmitted via corresponding ones of a plurality of access points, thereby increasing the effective bandwidth available for transmitting the data, each of the plurality of access points configured to:

communicate with the client using a different protocol; and communicate with the proxy server using a different network path; and transmitting each of the plurality of data packets between the client and the proxy server via the scheduled plurality of access points.

* * * * *